United States Patent [19]

Takenaga et al.

[11] 4,248,731
[45] Feb. 3, 1981

[54] THERMOLUMINESCENT MATERIAL

[75] Inventors: Mutsuo Takenaga, Katano; Osamu Yamamoto; Tadaoki Yamashita, both of Hirakata, all of Japan

[73] Assignee: Matsushita Electric Industrial Co., Ltd., Japan

[21] Appl. No.: 7,763

[22] Filed: Jan. 29, 1979

Related U.S. Application Data

[63] Continuation of Ser. No. 835,816, Sep. 22, 1977, abandoned.

[30] Foreign Application Priority Data

Sep. 22, 1976 [JP] Japan ................. 51-113933

[51] Int. Cl.$^2$ ............................................. C09K 11/28
[52] U.S. Cl. ............................ 252/301.4 R; 252/408; 250/337; 250/484
[58] Field of Search ...................... 252/301.4 R, 408; 250/337, 484

[56] References Cited

U.S. PATENT DOCUMENTS 3,554,920  1/1971  Becker .................. 252/301.4 R
3,573,221  3/1971  Brunskill ................ 252/301.4 R

OTHER PUBLICATIONS

Sekine, "Denki Kagaki Oyobi Kogyo Butsuri Kagaku," pp. 404–407, 42 (8), 1974.
Thompson et al., "Chem. Abstracts," vol. 79, 1973, 141198P.

*Primary Examiner*—Jack Cooper
*Attorney, Agent, or Firm*—Wenderoth, Lind & Ponack

[57] ABSTRACT

A phosphor for a thermoluminescent radiation dosimeter, comprising lithium tetraborate as a base material and copper as an activator. In addition to these components lithium octaborate may further be included as a base material, and silver as an activator. The phosphors according to the invention have an effective atomic number quite near to that of tissue, so that it is suitable for measuring the radiation dose absorbed by a tissue specimen. Further they exhibit emission a spectra peak at 368 m$\mu$ which is convenient for measuring the response of widely used photomultiplier tubes. The sensitivities to $\gamma$-rays are also improved, compared to the known lithium borate phosphor.

4 Claims, 15 Drawing Figures

THERMOLUMINESCENT MATERIAL

This is a continuation, of application Ser. No. 835,816, filed Sept. 22, 1977, now abandoned.

BACKGROUND OF THE INVENTION

This invention relates to thermoluminescent dosimeters and more particularly to tissue equivalent dosimeters which exhibit emission spectra lying in the near ultra-violet region and have high sensitivities to X, gamma and neutron radiations.

The thermoluminescent dosimeter is often employed for measuring an absorbed radiation dose of tissue. Accordingly, it is required that an effective atomic number of the dosimeter, $\overline{Z}_E$, be as near as possible to that of tissue. It is generally known that a lithium borate is one of the thermoluminescent materials having nearest $\overline{Z}_E$ value to that of tissue. Two lithium borate phosphors have been reported and to accomplish the tissue equivalent dosimetry. One of them is manganese-activated lithium tetraborate, and other is silver-activated one. The thermoluminescence emission spectra of both phosphors, however, do not exist in the near ultra-violet region (300 to 500 m$\mu$) where widely used photomultiplier tubes show maximum response, the former existing at about 600 m$\mu$ and the latter at about 290 m$\mu$. This causes a loss of optical efficiency in detecting thermoluminescence by the photomultiplier tube, and results in low sensitivity of both phosphos to radiation. Further, lower detection limits of the phosphors are 50 mR and more, and therefore these phosphors are not suitable for application to measurement of a low level radiation dose.

SUMMARY OF THE INVENTION

It is thus an object of this invention to provide the thermoluminescence phosphors and method for tissue equivalent dosimetry whereby the above disadvantages can be overcome.

One of the thermoluminescent phosphors in this invention is based on lithium tetraborate or mixture thereof with lithium octaborate containing copper as activator. The other is a phosphor containing both of copper and silver as activator.

These phosphors can be used as a powder, or as encapsulated glass ampoule, or film element prepared with heat-proof resin for dosimetry. After exposure to radiation, the dosimeters are heated to about 350° C. by an adequate method. Through heating, the thermoluminescence emitted from the phosphor can be detected by the photomultiplier tube. The intensity of the thermoluminescence is proportional to the exposure, as described after.

A method of preparation of the present phosphors is described in the following.

Lithium tetraborate $Li_2O.2B_2O_3$ and as the case may be boric acid $B_2O_3$ (or $H_3BO_3$) can be used as starting materials. As activator materials, copper metal Cu and silver metal Ag, or their oxides CuO (or $Cu_2O$) and $Ag_2O$, or chlorides $CuCl_2$ (or CuCl) and AgCl, or sulfides CuS and $Ag_2S$ can be used. The $Li_2O.2B_2O_3$ and $B_2O_3$ (or $H_3BO_3$) and a small amount of activators are mixed and subjected to firing at 950° C. for 5-100 min. in an electric furnace or radio frequency induction furnace followed by rapid cooling to room temperature. The resulting glassy material is reheated for $\frac{1}{2}$ hr at 650° C. to assure completion of crystallization. Thus, the phosphors based on the lithium borate crystal can be obtained. The composition of lithium tetraborate and octaborate in the phosphor can be varied by changing the mixing ratio of $B_2O_3$ (or $H_3BO_3$) to $Li_2O.2B_2O_3$.

BRIEF DESCRIPTION OF THE DRAWINGS

The drawings, which are illustrative only, are as follows.

DETAILED DESCRIPTION OF EMBODIMENTS

EXAMPLE 1

Figure 1:
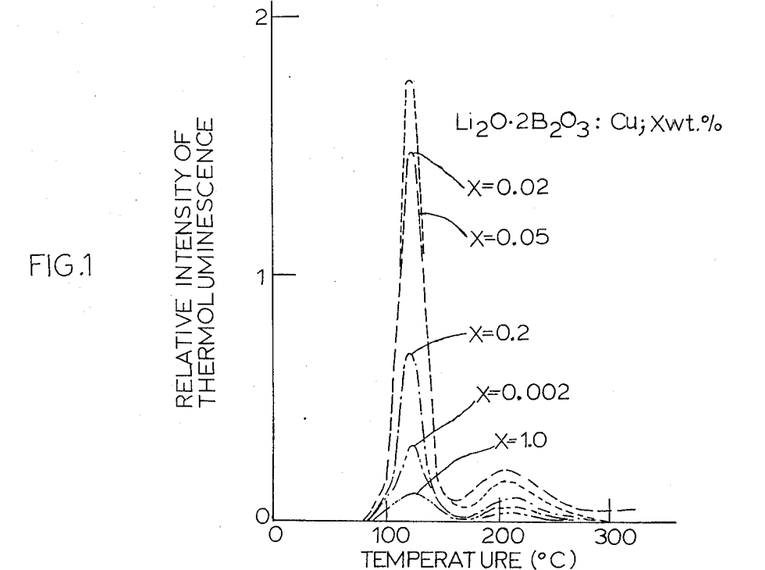
FIGS. 1, 5 and 7 show the thermoluminescent glow curves for the oithium borate phosphors activated with copper.

The mixture of $Li_2O.2B_2O_3$ and 0.02% by weight of Cu metal powder was fired and recrystallized in platinum crucible according to the foregoing method. In FIG. 1 are illustrated thermoluminescent glow curve of the phosphor obtained. The glow curve shows two peaks at 120° C. and 210° C.

The glow curves when Cu concentration was varied from 0.002 to 1.0 wt %, are also shown in FIG. 1. The 210° C. peaks of any phosphors are lower than that of the phosphor containing 0.02 wt% Cu, but these phosphors can be satisfactorily used for radiation dosimetry.

In the thermoluminescence emission spectra of above phosphors, the main emission peaks appear at 368 m$\mu$.

EXAMPLE 2

Figure 2:
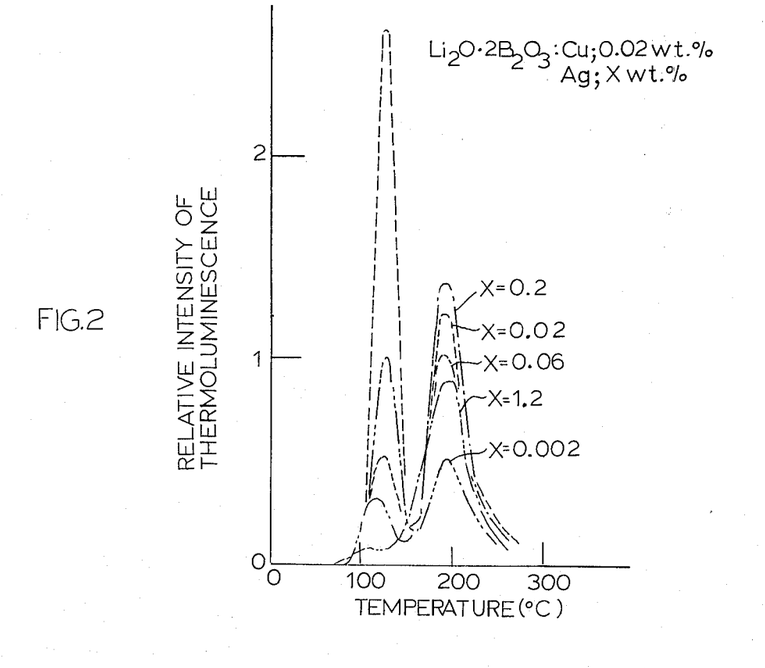
FIGS. 2, 4, 8, 10 and 11 show the glow curves for the lithium borate phosphors activated with both of copper and silver.

The phosphors activated with both Cu and Ag were prepared in the same manner as in Example 1. The amount of Cu powder was kept at 0.02 wt% and furthermore Ag metal powder of from 0.002 to 1.2 wt% were added. FIG. 2 shows the glow curves for the phosphors obtained. By adding Ag, the glow peaks shift to 110° and 185° C., respectively. Any phosphors shown in this figure possess high sensitivity to radiation and therefore can be used for radiation dosimetry.

Figure 3A:
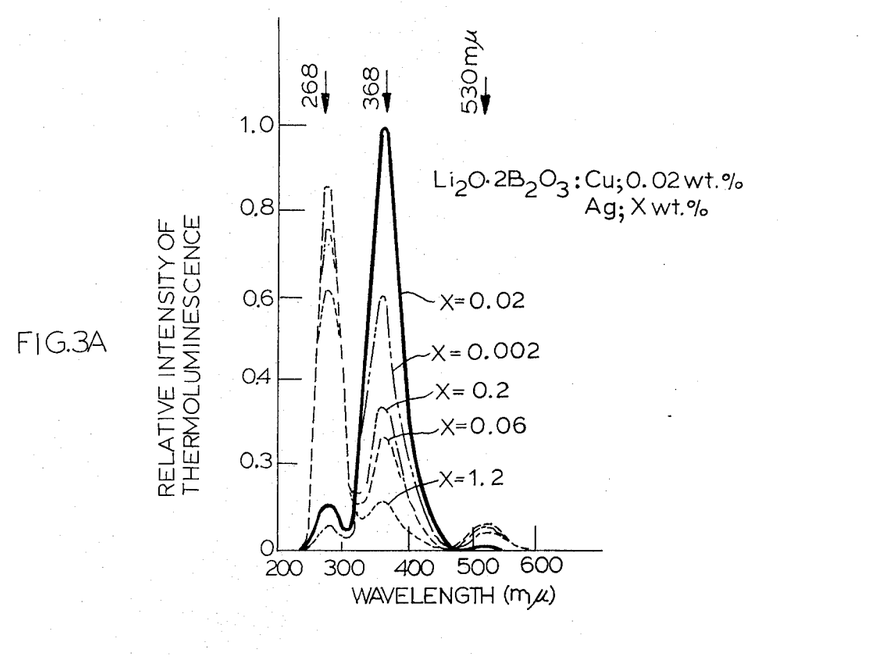
FIGS. 3 and 9 show the emission spectra for the lithium borate phosphors activated with copper and silver.

The thermoluminescent emission spectra of the above phosphors were measured and shown in FIG. 3(A). Main emission peaks appear at 368 and 268 m$\mu$. These spectral peaks are suitable for the spectral sensitivity of widely used photomultiplier tubes.

EXAMPLE 3

Figure 4:
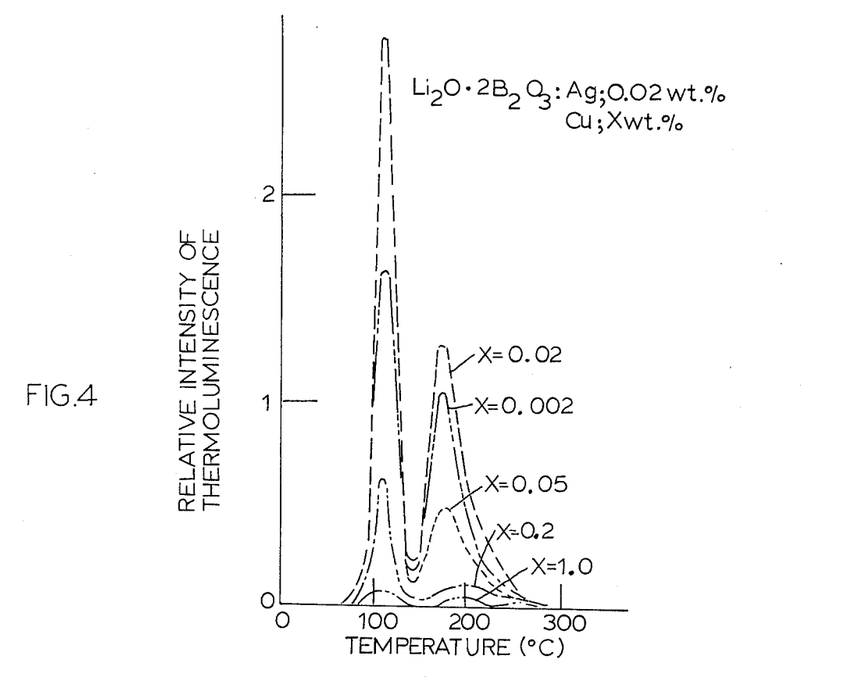

The phosphors activated with both Cu and Ag were prepared, keeping amount of Ag powder at 0.02 wt% and varying amount of Cu powder from 0.002 to 1.0 wt%. FIG. 4 shows the glow curves for the phosphors obtained. When the amount of Cu is 0.02 wt%, the highest 185° C. peak is observed. When other amounts of Cu are added, the peaks decrease but these phosphors can be also used for dosimetry.

Figure 3B:
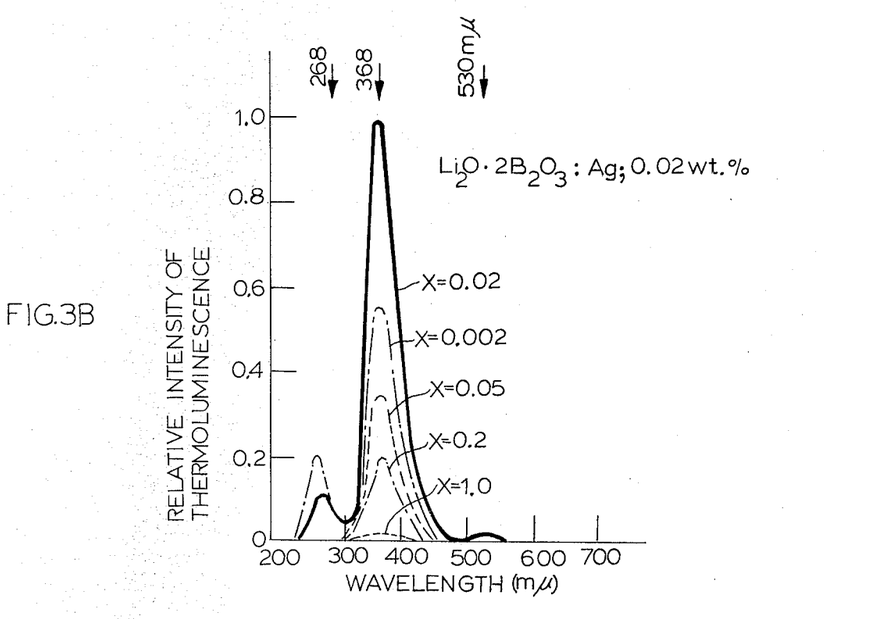

The emission spectra of the above phosphors are shown in FIG. 3(B). The main emission peak appears at 368 mμ and is fit for the spectral sensitivity of the photomultiplier tubes.

EXAMPLE 4

Figure 5:
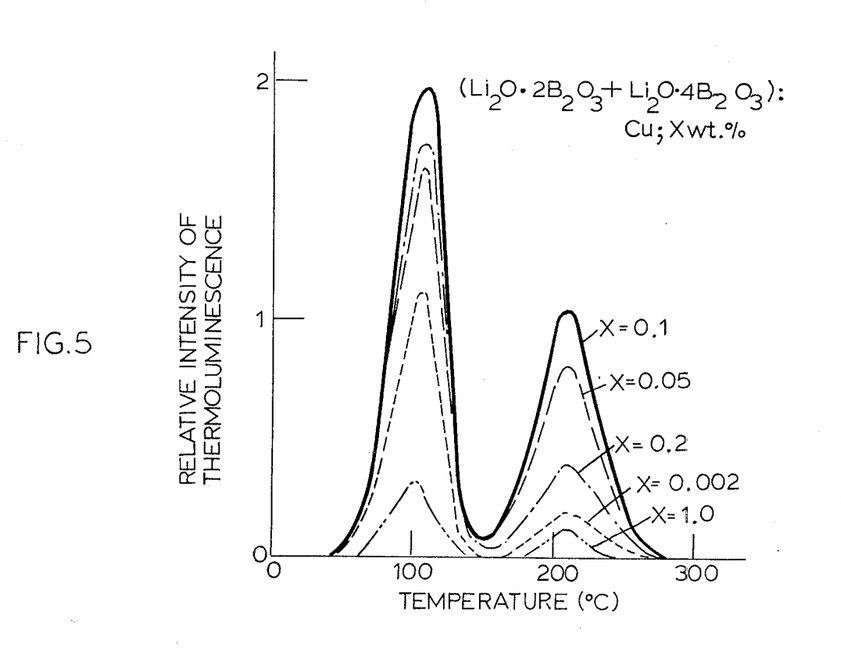

The mixture of 5 grams $Li_2O.2B_2O_3$ powder and 1 gram $B_2O_3$ and 0.1 wt% Cu powder was fired and recrystallized according to the foregoing method. FIG. 5 shows the glow curves for the phosphors obtained. The glow peaks appear at 120° and 210° C.

The glow curves when the Cu concentration was varied from 0.002 to 1.0 wt% are also shown in this figure. Any 210° C. peaks are smaller than that for the phosphor containing 0.1 wt% Cu, but these phosphors can be also used for radiation dosimetry.

Figure 6A:
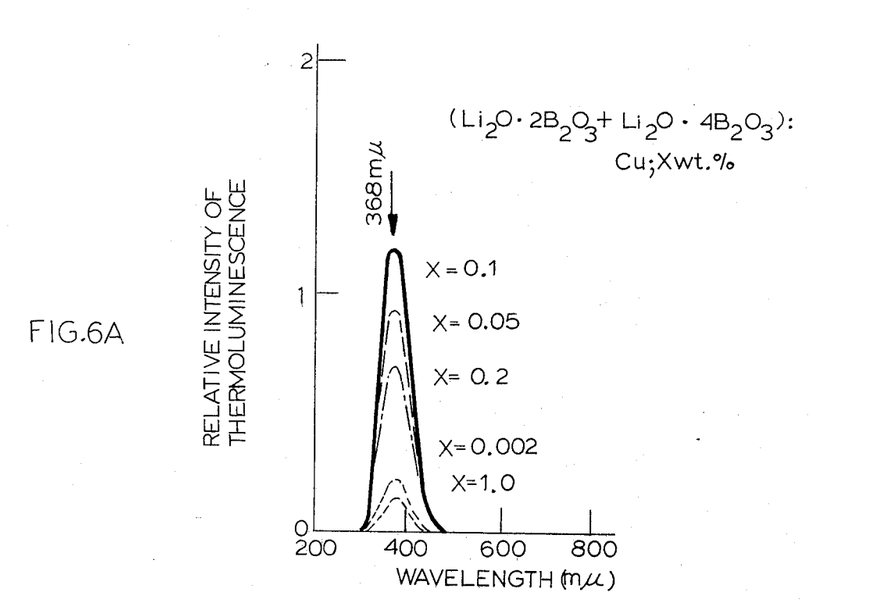
FIG. 6 shows the thermoluminescence emission spectra for the lithium borate phosphors activated with copper.

The emission spectra of the above phosphors are shown in FIG. 6(A). The main emission peak appears at 368 mμ and is suitable for the spectral sensitivity of the photomultiplier tube.

EXAMPLE 5

Figure 7:
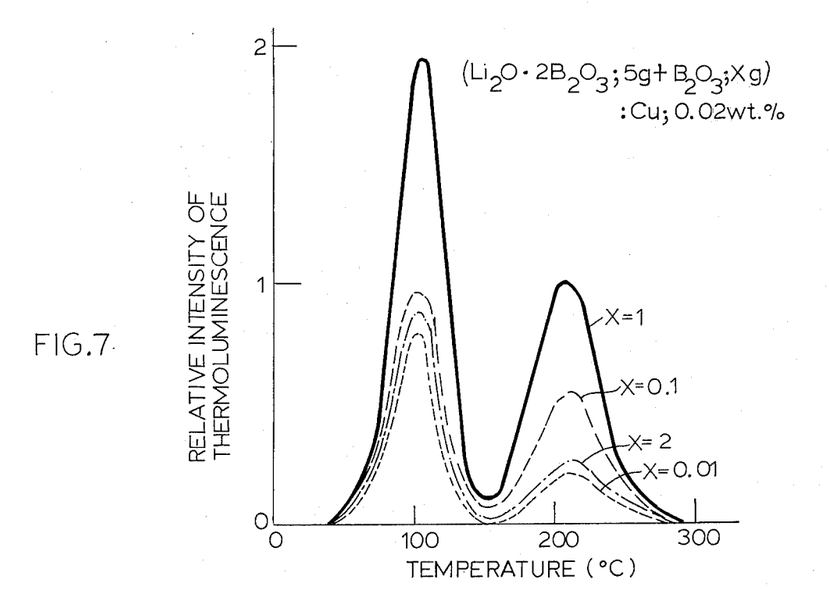

The mixtures of 5 grams $Li_2O.2B_2O_3$ powder and 0.02 wt% Cu powder and $B_2O_3$ powder from 0.01 to 2 grams were fired and recrystallized according to the foregoing method. The resulting glow curves are shown in FIG. 7. By adding 1 gram of $B_2O_3$, the 210° C. glow peak increases markedly. In the other additions, the sensitivities to radiation decrease in any case but these phosphors can be also used for radiation dosimetry.

Figure 6B:
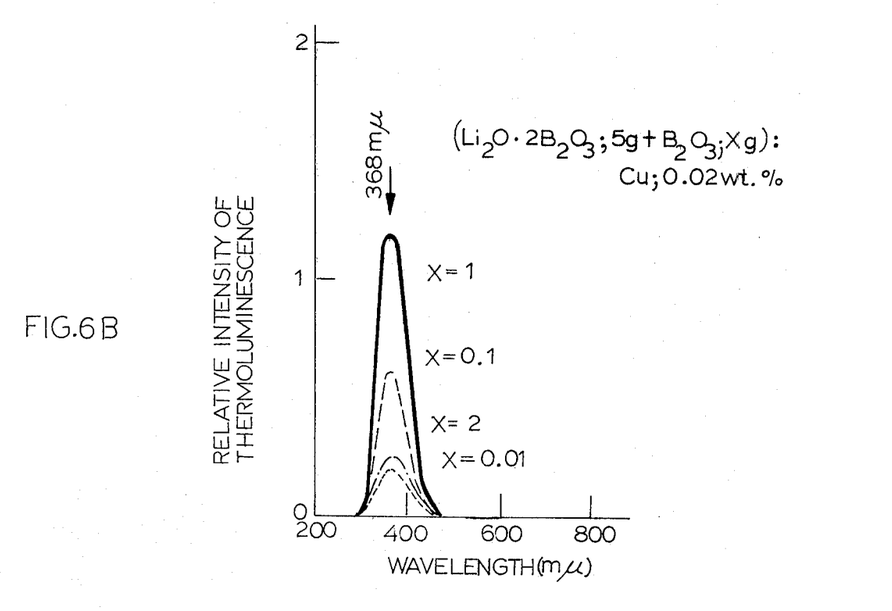

The emission spectra of the above phosphors are shown in FIG. 6(B). The main emission peak appears at 368 mμ in any phosphors and this is suitable for the spectral sensitivity of the photomultiplier tube.

The composition of the above phosphors was analysed using X-ray diffraction and chemical analysis. The phosphors were the mixed crystals comprising $Li_2O.2B_2O_3$ and $Li_2O.4B_2O_3$.

The phosphor prepared by adding 4.4 grams of $B_2O_3$ powder to 5 grams of $Li_2O.2B_2O_3$ was a mixed crystal comprising $Li_2O.3B_2O_3$ and $Li_2O.4B_2O_3$, and showed a negligibly small sensitivity to radiation. Namely, excessive addition of $B_2O_3$ brings about a bad effect because the disappearance of $Li_2O.2B_2O_3$ is caused.

EXAMPLE 6

Figure 8:
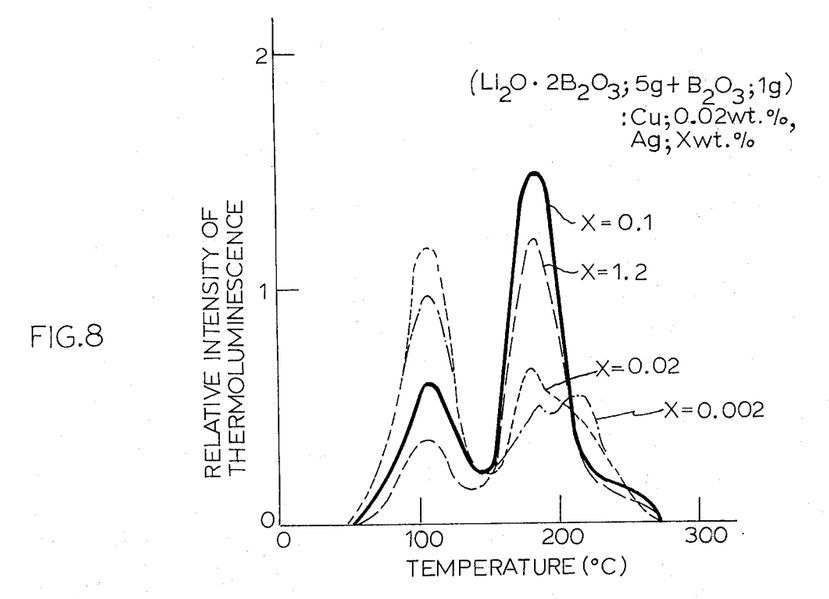

The phosphors activated with both Cu and Ag were prepared in the same amounts of $Li_2O.2B_2O_3$ and $B_2O_3$ as in Example 4 using 0.02 wt% of Cu powder and from 0.002 to 1.2 wt% of Ag powder. FIG. 8 shows the glow curves for the phosphors obtained. By adding Cu and furthermore Ag, the glow peaks appear at 110° and 185° C., and any phosphors can be used for radiation dosimetry.

Figure 9A:
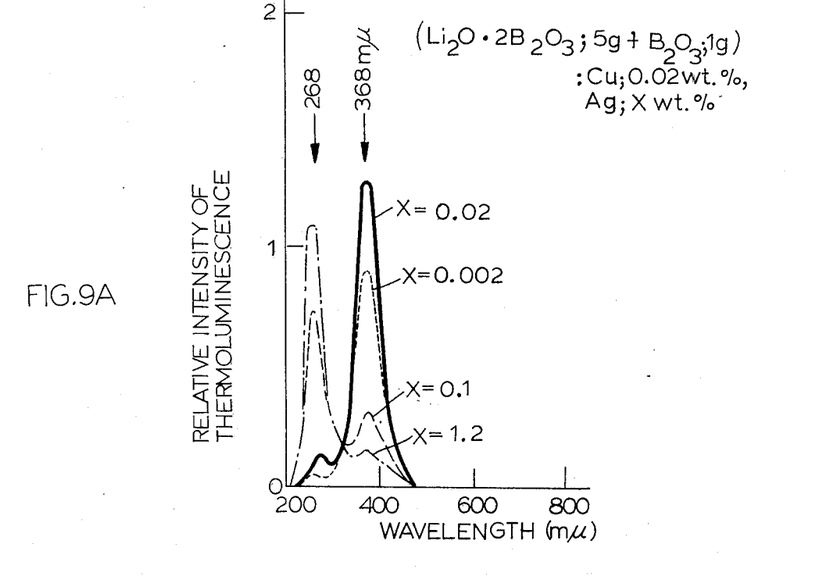

The emission spectra of the above phosphors are shown in FIG. 9(A). The emission peaks appear at 368 and 268 mμ. These emissions are suitable for the spectral sensitivity of the photomultiplier tube.

EXAMPLE 7

Figure 10:
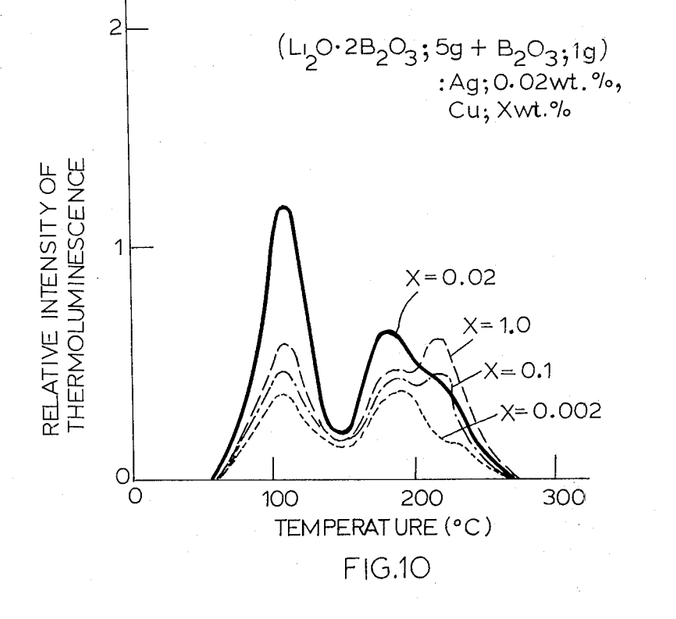

Example 4 was repeated using 0.02 wt% of Ag powder and Cu powder from 0.002 to 1.0 wt%. The resulting glow curves are shown in FIG. 10. The phosphor when 0.02 wt% Cu added shows the highest 185° C. peak. In other additions, the sensitivities slightly decrease but these phosphors can be also used for radiation dosimetry.

Figure 9B:
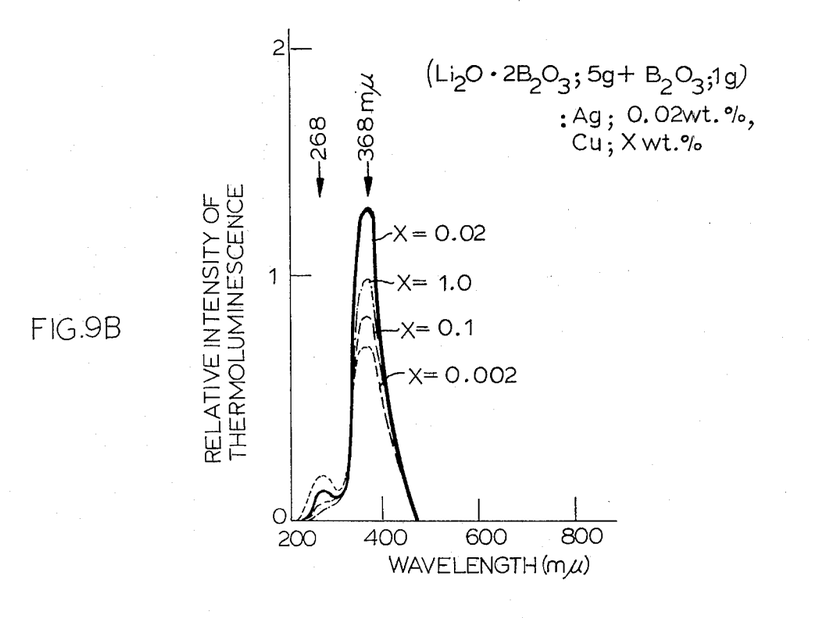

The emission spectra of the above phosphors are shown in FIG. 9(B). Two emission peaks appear at 368 and 268 mμ. These emission peaks are suitable for the spectral sensitivity of the photomultiplier tube.

EXAMPLE 8

Figure 11:
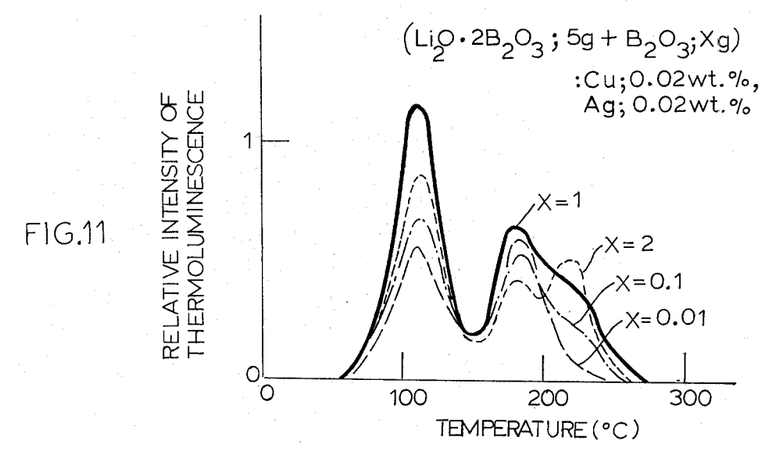

Example 5 was repeated using the same amounts of $Li_2O.2B_2O_3$ and $B_2O_3$; except that both of 0.02 wt% Cu and Ag powder were added as activator. The resulting glow curves are shown in FIG. 11. The phosphor when 1 gram of $B_2O_3$ added shows the highest 185° C. peak. In other additions, the sensitivities to radiation slightly decrease but they can be also used for radiation dosimetry.

Figure 12:
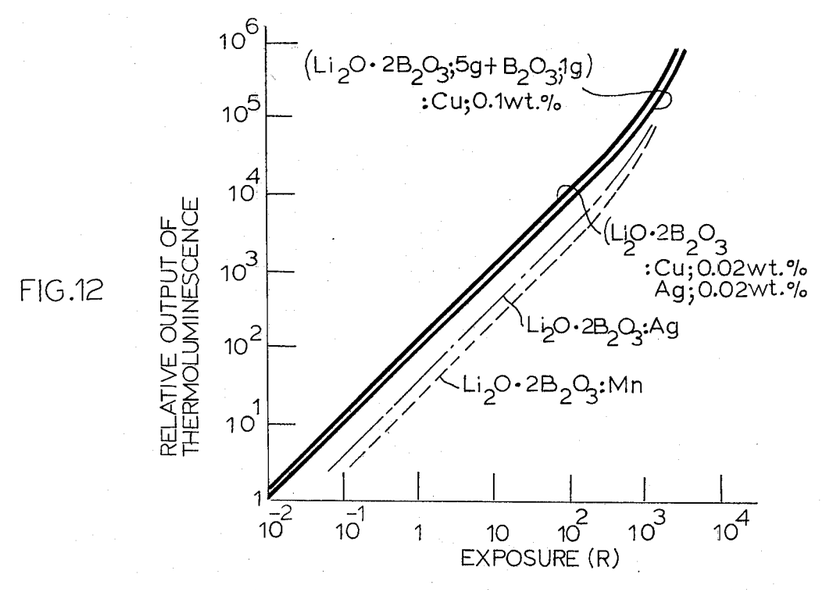
FIG. 12 shows exposure response curves for the present and other lithium borate phosphors.

Exposure response curves for the phosphors provided in this invention as a function of γ-ray exposure are shown in FIG. 12. As can be seen, the thermoluminescence outputs are linear from about 10 mR to about 300 R. In this figure there are also illustrated the curves for the known lithium borate phosphors $Li_2O.2B_2O_3$:Mn and $Li_2O.2B_2O_3$:Ag. The phosphors in this invention possess higher sensitivities to radiation by about 2-4 times than that of manganese or silver activated phosphors.

According to the present invention there are provided lithium borate thermoluminescent phosphors exhibiting the emission spectra at 368 mμ. Thereby, it is now possible to bring the emission for lithium borate phosphor into the near ultra-violet region, wherein the widely used photomultiplier tubes show exhibit maximum response.

The sensitivities to γ-rays are about 2 times or 4 times higher for the present phosphor than for the known manganese or silver activated one. Thus, we have obtained a highly sensitive lithium borate phosphor whose lower detection limit is 10 mR, and this promises to permit application of the present phosphor for personnel dosimetry.

What is claimed is:

1. A thermoluminescent material for a thermoluminescent radiation dosimeter, consisting essentially of lithium tetraborate ($Li_2O.2B_2O_3$) as a base material and copper as an activator in the range of 0.002 to 1.0 wt% on said base material, said thermoluminescent material exhibiting a thermoluminescent emission spectrum characterized by a main emission peak at 368 mμ and being prepared by mixing said base material and activator, firing said mixture at 950° C., rapidly cooling to form a glassy material and then reheating said glassy material to assure complete crystallization.

2. The thermoluminescent material according to claim 1, further containing silver as an activator in the range of 0.002 to 0.02 wt% on said base material, so as to improve the sensitivity thereof.

3. The thermoluminescent material according to claim 1 wherein the firing is performed at 950° C. for 5 to 100 minutes, the rapid cooling is to room temperature and the reheating is at 650° C. for ½ hour.

4. The thermoluminescent material according to claim 2 wherein the firing is performed at 950° C. for 5 to 100 minutes, the rapid cooling is to room temperature and the reheating is at 650° C. for ½ hour.

* * * * *